US012226721B2

(12) United States Patent
Lewis

(10) Patent No.: US 12,226,721 B2
(45) Date of Patent: Feb. 18, 2025

(54) FILTER BUOY ASSEMBLY

(71) Applicant: Christopher B Lewis, Austin, TX (US)

(72) Inventor: Christopher B Lewis, Austin, TX (US)

( * ) Notice: Subject to any disclaimer, the term of this patent is extended or adjusted under 35 U.S.C. 154(b) by 0 days.

(21) Appl. No.: 18/622,912

(22) Filed: Mar. 30, 2024

(65) Prior Publication Data

US 2024/0325947 A1 Oct. 3, 2024

Related U.S. Application Data

(60) Provisional application No. 63/455,977, filed on Mar. 31, 2023.

(51) Int. Cl.
*B01D 35/05* (2006.01)
*B01D 29/01* (2006.01)

(52) U.S. Cl.
CPC ............ *B01D 35/05* (2013.01); *B01D 29/01* (2013.01); *B01D 2201/4007* (2013.01)

(58) Field of Classification Search
CPC . B01D 29/01; B01D 35/05; B01D 2201/4007
See application file for complete search history.

(56) References Cited

U.S. PATENT DOCUMENTS

| | | | |
|---|---|---|---|
| 4,179,379 A * | 12/1979 | Mitchell | B01D 29/01 210/242.1 |
| 4,210,528 A | 7/1980 | Coviello et al. | |
| 4,697,609 A | 10/1987 | Salewski | |
| 4,812,237 A | 3/1989 | Cawley et al. | |
| 4,904,387 A | 2/1990 | Jordan | |
| 5,019,252 A | 5/1991 | Kamei et al. | |
| 5,266,196 A | 11/1993 | Fife et al. | |
| 5,972,216 A | 10/1999 | Acernese et al. | |
| 6,027,642 A | 2/2000 | Prince et al. | |
| 6,616,850 B1 | 9/2003 | Moore et al. | |
| 7,632,397 B2 | 12/2009 | Bathula | |
| 7,722,091 B1 | 5/2010 | Brockington et al. | |
| 7,754,090 B1 | 7/2010 | Berg | |
| 8,377,291 B2 | 2/2013 | Eckman | |
| 8,709,252 B2 | 4/2014 | Gabriel et al. | |
| 10,647,592 B2 | 5/2020 | Geelhood et al. | |
| 2007/0125713 A1 | 6/2007 | Harris | |
| 2009/0236295 A1 | 9/2009 | Braun et al. | |
| 2010/0043129 A1 | 2/2010 | Platteel et al. | |
| 2010/0051546 A1 * | 3/2010 | Vuong | B01D 61/027 210/124 |
| 2010/0270227 A1 * | 10/2010 | Kang | B01D 65/00 210/232 |
| 2014/0202948 A1 | 7/2014 | Li | |
| 2021/0179468 A1 | 6/2021 | Fastner | |

FOREIGN PATENT DOCUMENTS

CN 204095421 U * 1/2015
ES 2923113 T3 * 9/2022 ............. B63B 22/02

OTHER PUBLICATIONS

Wang et al—CN 20495421 U machine translation—Jan. 14, 2015 (Year: 2015).*
Plate, Bonfiglio et al—ES 2923113 T3 FIT 0 Sep. 23, 2022 (Year: 2022).*

* cited by examiner

*Primary Examiner* — Bradley R Spies
(74) *Attorney, Agent, or Firm* — Ziegler IP Law Group, LLC

(57) ABSTRACT

A water filter buoy assembly includes a float, a frame for holding a filter, and at least one arm connecting the float to the frame.

11 Claims, 5 Drawing Sheets

FILTER BUOY ASSEMBLY

FIELD

The disclosed exemplary embodiments are directed to a filter assembly, and in particular, a filter assembly that supports a filter below a surface of a liquid being filtered.

BACKGROUND

For purposes of the disclosed embodiments, wastewater may be defined as any water-based liquid requiring processing to either extract or transform the wastewater into a usable form as defined through product specifications (example: beverage processing) or regulation (example: drinking water standards). Many names exist for wastewater, such as industrial wastewater, grey water, and black water.

Properly treated wastewater/water is essential to human life and progress. As technologies advance in arenas of connectivity, sustainable energy generation/storage, and sustainable transportation, decentralized water capture and treatment for human consumption and processing is growing as a complementary component to the ongoing advancement of human civilization. Wastewater treatment processing and purification for safe human consumption require multiple steps to effectively remove undesirable constituents as dictated by specification and/or regulation.

At large scale treatment for most types of wastewater is a well-established art, detailed in a wide variety of multistep processes such as conventional activated sludge (CAS) treatment, upflow anaerobic sludge blanket (UASB) technology, and membrane bioreactor (MBR) processes. Within these processes filtration steps provide prominent and effective treatment. The filtration steps are generally included in processes for such diverse treatment objectives as domestic wastewater treatment, commercial dairy processing, desalination, and surface drinking water treatment.

Mechanical filtration technologies currently exist in a wide array of shapes, sizes, and materials and employ unique structural housings to ensure the active filter or membrane components are properly oriented, stabilized, and plumbed to ensure effectiveness. Because most of these processes and technologies are intended to treat large volumes of wastewater, directly applying these same techniques to smaller scale treatment is often cost prohibitive In order to effectively filter wastewater, all treatment systems must have access to wastewater such that it is effectively captured and delivered to the treatment system. For large scale public utilities (wastewater and drinking water treatment plants), manufacturing plants, and stormwater treatment facilities, capture and delivery of wastewater is typically accomplished via piping networks, pump stations, and storage tanks. Within these plants, filtration steps function to remove undesirable constituents and suspended solids via mechanically fixed filters. These filters are structurally held to ensure intended operation and regular maintenance access, usually within a professionally engineered building or site plan. Maintenance, repair, or replacement typically involves shutting down the treatment process, removing at least one filter assembly from a submerged location or in-line feed, and finally dismantling the filter assembly for filter access and maintenance or replacement.

For a less centralized approach to personal or household scale water treatment, commercially available portable and semi-portable water filter systems are available. These systems typically involve handheld mechanisms or probes to capture water intended for treatment, or these existing systems may be integrated as part of a larger treatment container where wastewater is manually introduced by the user, and ultimately filtered and stored by the treatment device. The disclosed embodiments provide more comprehensive treatment on a more automated basis.

Rainwater harvesting also presents an opportunity to treat wastewater, specifically captured rainwater. Harvesting may incorporate smaller scale devices such as filters located within or attached to rainwater capture tanks. Depending on the treatment objectives, additional process steps may be incorporated, such as those listed above.

SUMMARY

The disclosed embodiments are directed to a floating filter assembly for the capture and treatment of wastewater from a body of wastewater without the need for additional structural mechanisms or piping infrastructure to ensure proper filter orientation, stability, or placement.

As the entire module is floating in a body of water, buoyed by a stabilizing pontoon, the flat plate housing is angled multi-directionally to ensure solids do not permanently settle on top of the plate. Additionally, the plate is sufficiently submerged below the pontoon to ensure that higher buoyancy pollutants remain above the plate surface where they may not inhibit water filtration.

Through a stable flotation and filter arrangement, the disclosed embodiments offer accessibility to water filtration with the flexibility and operability of more advanced fixed-in-place filter arrangements.

The presently disclosed embodiments ensure proper immersion and orientation of a flat filter within a body of wastewater via flotation for treatment of water volumes commensurate with the needs of a single person or small-scale treatment process.

The disclosed embodiments are directed to a water filter buoy assembly including a float, a frame for holding a filter below the float at an angle and at least one arm connecting the float to the frame.

The water filter buoy assembly may include a frame with an angled slot for inserting a filter, a nozzle adapter with both a secure, leak-proof inlet for receiving a filter nozzle, and an outlet for permeate discharge, rails for filter insertion and mechanical protection, a bottom member for resting the water filter buoy assembly approximately level on a flat surface, snap-fit connection points for the rails and nozzle adapter, a float sized to maintain proper orientation and flotation of the water filter buoy assembly, at least one arm connecting the float to the frame, a snap-fit connection points for the at least one arm, wherein the snap-fit connection points may allow filter operation angles from zero to 90 degrees from horizontal, and a handle for placement of the water filter buoy assembly in water or for removal or transport.

The water filter buoy assembly may be capable of receiving ceramic and polymeric based flat plate filters of variable dimensions with filter nozzle sizes ranging from 1 mm to 10 mm in diameter.

The construction materials of the water filter buoy assembly may be compatible with domestic wastewater, grey water, rainwater, stormwater, sea water, well water, and surface waters such as rivers and lakes.

The construction materials may be compatible with food grade processes such dairy, juice, and fermentation processing.

The disclosed embodiments may further be directed to water filter buoy assembly including a float, a frame for holding a filter, and at least one arm connecting the float to the frame.

The float may have a shape of a right circular cylinder.

The frame may include opposing rails and a slot for receiving the filter, the opposing rails extending perpendicular to the slot.

The slot may be oriented in a first plane at an angle to a base of the float.

The frame may be oriented in a second plane different from the first plane.

The water buoy assembly may include a mechanism for orienting the frame at different second planes.

The at least one arm may include an attachment to the frame at an adjustable angle from 0 to 90 degrees.

BRIEF DESCRIPTION OF THE DRAWINGS

FIG. 3b shows a rear isometric view of the water filter buoy assembly of FIG. 3a;

FIG. 4b depicts a rear isometric view of the water filter buoy assembly of FIG. 4a;

FIG. 5b is a cross sectional view of the water filter buoy assembly of FIG. 5a.

DETAILED DESCRIPTION

The aspects and advantages of the exemplary embodiments will become apparent from the following detailed description considered in conjunction with the accompanying drawings. It is to be understood, however, that the drawings are designed solely for purposes of illustration and not as a definition of the limits of the disclosed embodiments, for which reference should be made to the appended claims. Additional aspects and advantages of the disclosed embodiments will be set forth in the description that follows, and in part will be obvious from the description, or may be learned by practice of the disclosed embodiments. Moreover, the aspects and advantages of the disclosed embodiments may be realized and obtained by means of the instrumentalities and combinations particularly pointed out in the appended claims.

Figure 1A:
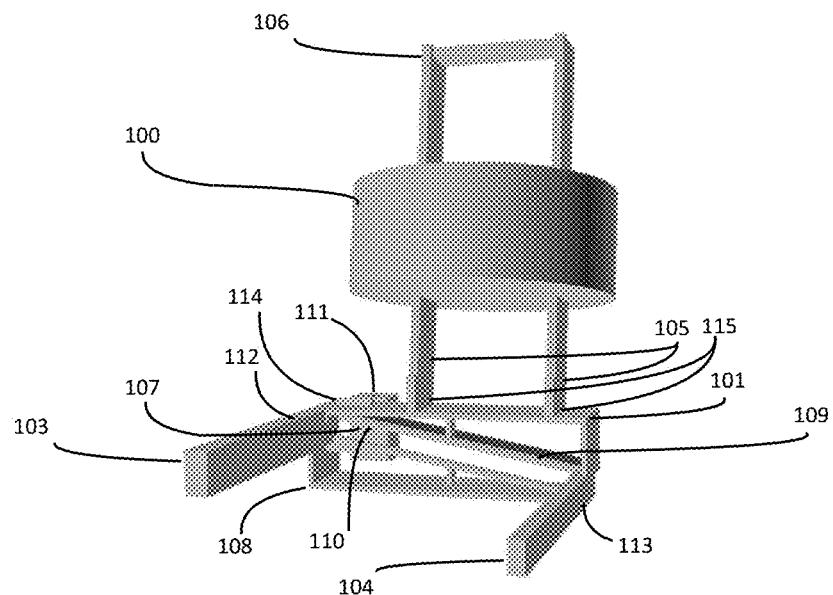
FIG. 1a shows an isometric view of the water filter buoy assembly according to the disclosed embodiments.
Figure 1B:
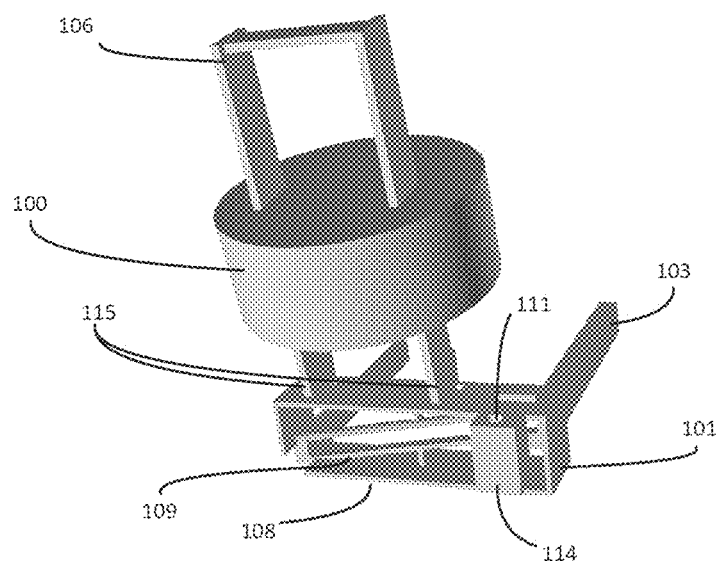
FIG. 1b depicts a rear facing isometric view of the water filter buoy assembly.

FIG. 1a shows a front facing isometric view of the water filter buoy assembly 10, and FIG. 1b shows a rear facing isometric view of the water filter buoy assembly 10. The water filter buoy assembly 10 may include a float 100, a frame 101 for holding a filter (201, FIG. 2a) and at least one arm 105 connecting the float 100 to the frame 101.

The float 100 is generally constructed to have a buoyant force greater than its weight, may be composed of any material suitable for immersion in wastewater, and may be configured to ensure the water filter buoy assembly 10 remains afloat and upright. The float 100 may have a shape of a right circular cylinder and may vary in diameter and height, depending on the filter 201 size and weight. The float may optionally include a handle 106, allowing for placement of the water filter buoy assembly 10 in water or for removal or transport. The handle 106 may vary in length.

The frame 101 may include rails 103, 104 and a slot 109 for receiving the filter 201. The rails 103, 104 may oppose each other and may extend perpendicular to the slot 109 along a length of the filter 201, and may vary in length corresponding with the filter length. The rails 103, 104 may assist with filter insertion in addition to providing mechanical protection for the filter 201. The rails may be removably coupled to the frame 101, for example, using snap fit connectors 112, 113, or any suitable fastening mechanism or method. In some embodiments, the rails may vary from 10-500 mm in length. The slot 109 may be generally rectangular and may be oriented in a first plane at an angle to a base of the float, for example, less than 90 degrees. In some embodiments, the slot may vary from 100-300 mm in length and from 2-10 mm in height. The frame 101 may further include a bottom member 108 which may provide a support for resting approximately level on a flat surface. The frame 101 may also include a detachable nozzle adapter 107 with an inlet 110 that interfaces with a filter nozzle and an outlet 111. The nozzle adapter 107 may be removably attached to the frame snap using any suitable connector, for example, one or more snap fit connectors 114.

The at least one arm 105 may connect the float 100 to the frame 101. A length of the at least arm 105 may vary depending on a predetermined depth of the frame. In some embodiments, the frame may be oriented in a second plane different from the first plane. The at least one arm 105 may be coupled to the frame 101 with a mechanism 115 that orients the frame in one or more second planes different from the first plane causing the filter to tip in two different planes. The mechanism may include, for example, snap-fit connectors. Depending on the application, the at least one arm may attach to the frame at adjustable angles from 0 to 90 degrees to ensure that when submerged, an end of the filter 201 opposite the slot 109 is lower than an end of the filter in the slot 109.

Figure 2A:
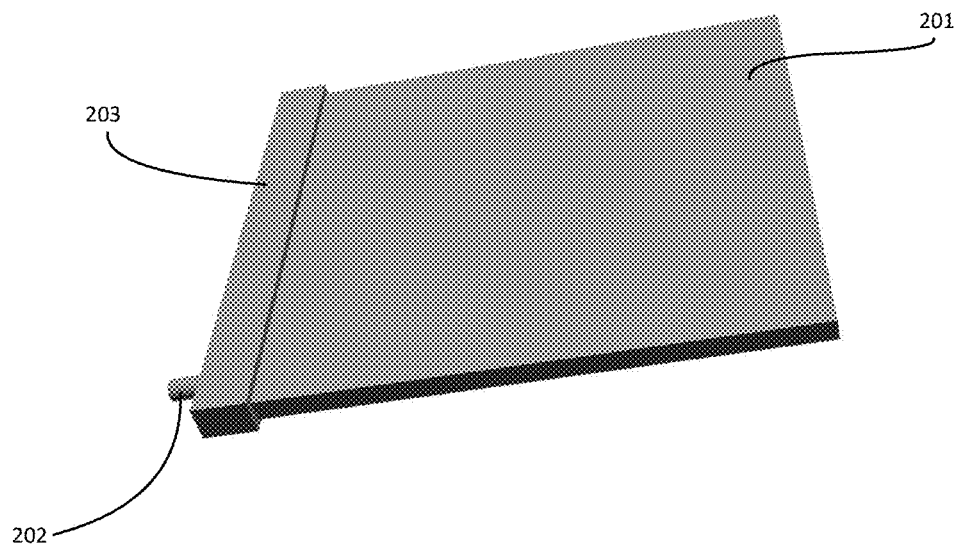
FIG. 2a shows an exemplary filter for use with the disclosed embodiments.

FIG. 2a shows an exemplary filter 201 for use with the disclosed embodiments. The disclosed embodiments may utilize commercially available filters formed in the shape of rectangular plates and having a filter-active outer side and an internal discharge channel for filtered water. The rectangular plates may form an internal collection space attached to a perimeter endcap 203. The endcap 203 may have at least one filter nozzle 202 such that wastewater enters the internal collection space through the rectangular plates and exits through the filter nozzle 202, thus ensuring that filtered water is securely transferred from the filter to an external point of use.

Figure 2B:
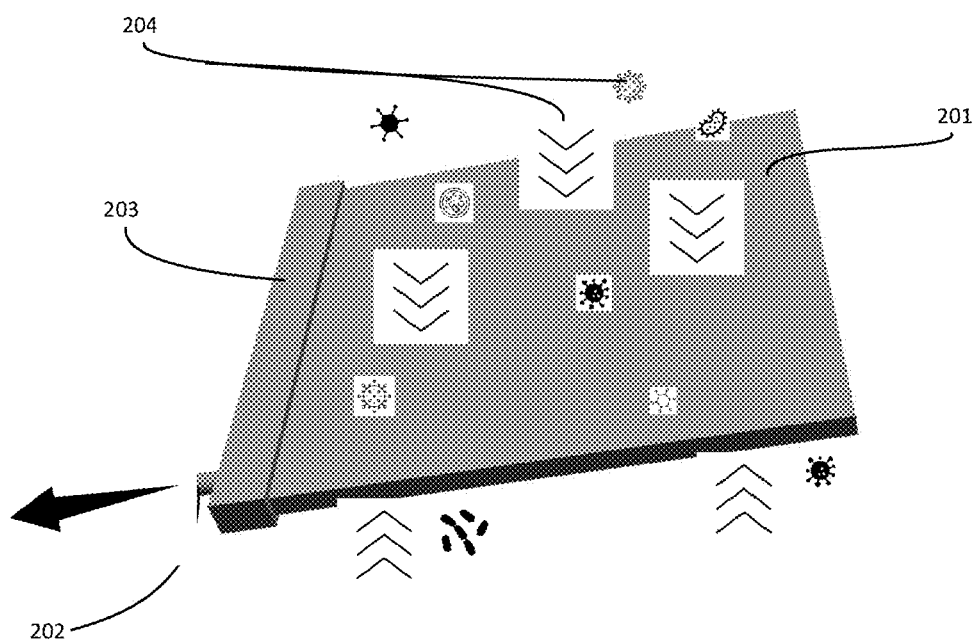
FIG. 2b illustrates an exemplary filter with a filter-active outer side, endcap, and discharge nozzle.
Figure 3A:
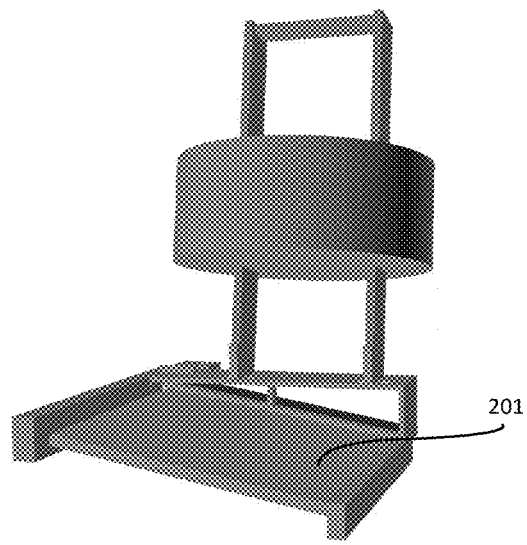
FIG. 3a depicts a front isometric view of a water filter buoy assembly with a filter installed and set at a 10 degree angle from horizontal.
Figure 3B:
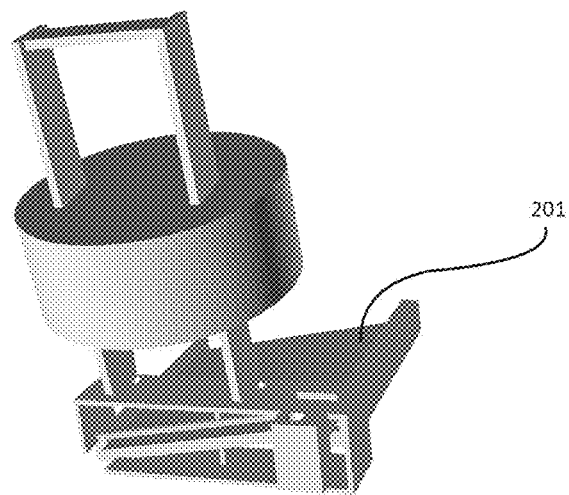
Figure 4A:
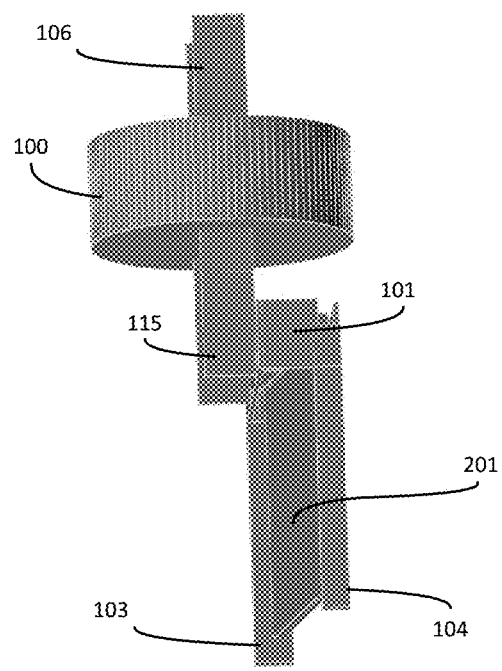
FIG. 4a illustrates a front isometric view of a water filter buoy assembly with a filter installed and set at a 90 degree angle from horizontal.
Figure 4B:
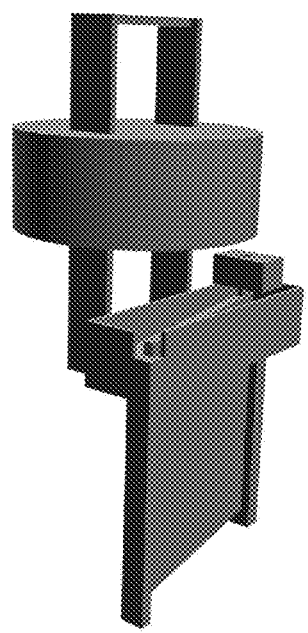
Figure 5A:
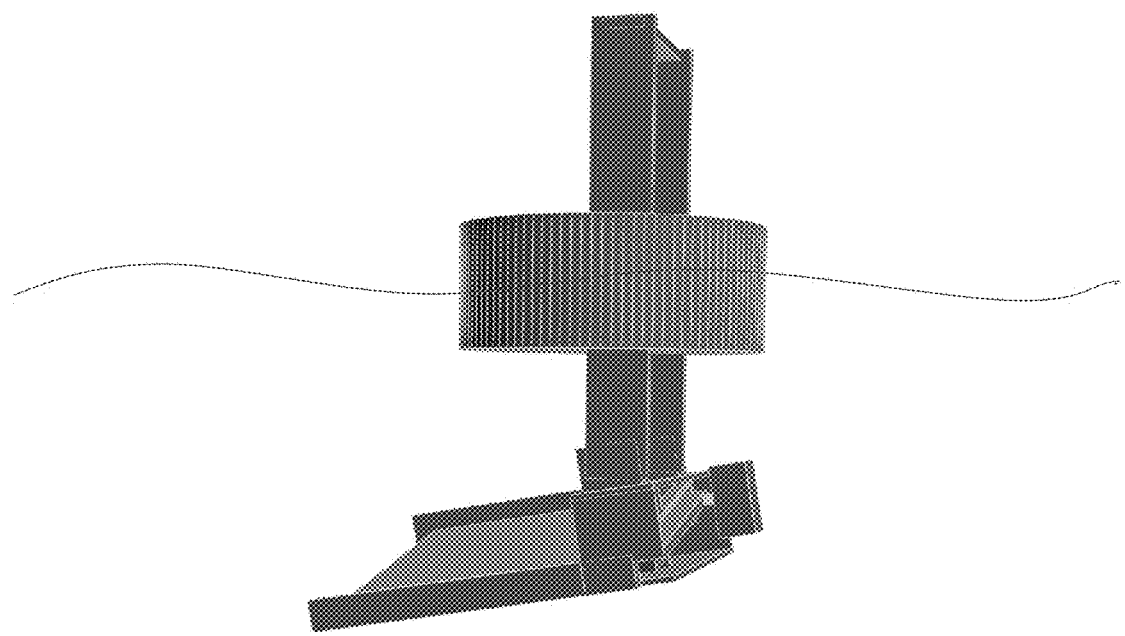
FIG. 5a shows a cross sectional view of a water filter buoy assembly in an operational setting, floating in wastewater where the filter is set at a 10 degree angle from horizontal.
Figure 5B:
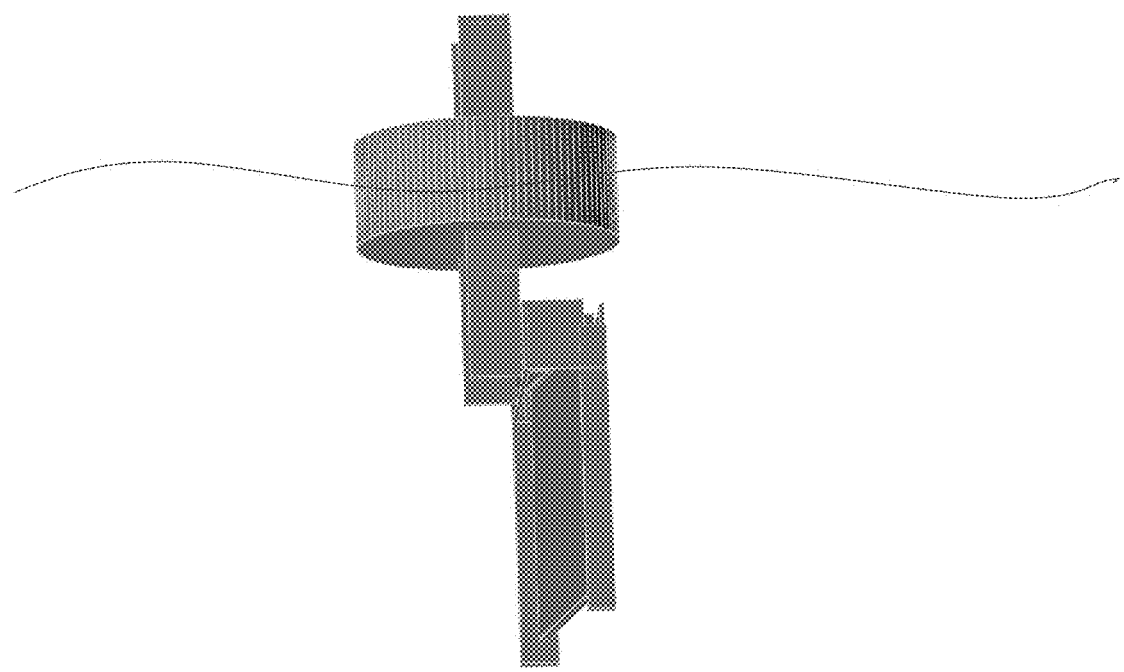

FIG. 2b shows the exemplary filter submerged in wastewater and actively filtering out suspended solids as the wastewater travels in through the rectangular plate and out the at least one liquid tight outlet 202. This view is provided to better convey the operation of the filter itself. Within the filter, permeate passes to the interior collection space and to the endcap 203. From the endcap 203, permeate passes through the at least one filter nozzle 202, into the water filter buoy assembly nozzle adapter 107 via the nozzle adapter inlet 110, and out through the nozzle adapter outlet 111 for additional treatment or discharge. Dimensions of the filter 201 may vary in length, width, and height. Various filter technologies may include a variety of pore sizes, including micro, ultra, and nanofiltration.

An exemplary filter installation may include sliding the filter 201 along rails 103, 104 into slot 109, removing the water filter buoy assembly nozzle adapter 107 from the frame and affixing the nozzle adapter 107 to the filter nozzle 202, ensuring a leak-proof fit.

FIGS. 3*a*, 3*b*, 4*a*, 4*b*, 5*a*, and 5*b* show alternate views and configurations of the disclosed embodiments.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

What is claimed is:

1. A water filter buoy assembly comprising:
   a float;
   a frame for holding a filter, the frame comprising opposing rails and a slot for receiving the filter, the opposing rails extending perpendicular to the slot, wherein the slot is oriented in a first plane at an angle to a base of the float and the frame is oriented in a second plane different from the first plane such that the filter tips in two different planes; and
   at least one arm connecting the float to the frame.

2. The water buoy assembly of claim 1, wherein the float has a shape of a right circular cylinder.

3. The water buoy assembly of claim 1, comprising a mechanism for orienting the frame in different second planes.

4. The water buoy assembly of claim 1, wherein the frame comprises a detachable nozzle adapter with an inlet that interfaces with a filter nozzle and an outlet.

5. The water buoy assembly of claim 1, wherein the at least one arm comprises an attachment to the frame at an adjustable angle from 0 to 90 degrees.

6. The water buoy assembly of claim 1, wherein the at least one arm is coupled to the frame with a mechanism that orients the frame in the second plane different from the first plane.

7. The water buoy assembly of claim 1, wherein the frame includes a bottom member providing a support for resting level on a flat surface.

8. The water buoy assembly of claim 1, wherein the filter comprises rectangular plates, the rectangular plates forming an internal collection space attached to a perimeter endcap.

9. The water buoy assembly of claim 7, wherein the endcap comprises at least one filter nozzle such that wastewater enters the internal collection space through the rectangular plates and exits through the filter nozzle.

10. The water buoy assembly of claim 1, wherein the rails are removably coupled to the frame.

11. The water buoy assembly of claim 1, wherein the slot is rectangular.

* * * * *